UNITED STATES PATENT OFFICE.

EMIEL STAHL, OF SULLIVAN, MISSOURI.

STOVE-POLISH.

SPECIFICATION forming part of Letters Patent No. 463,003, dated November 10, 1891.

Application filed March 26, 1891. Serial No. 386,556. (No specimens.)

*To all whom it may concern:*

Be it known that I, EMIEL STAHL, a citizen of the United States, and a resident of Sullivan, in the county of Franklin, and State of Missouri, have invented certain new and useful Improvements in Stove-Polish; and I do declare the following to be a full, clear, and exact description of the invention, such as will enable others skilled in the art to which it appertains to make and use the same.

This invention has relation to certain new and useful improvements in nut stove-polish; and it consists in the composition of the following-named ingredients, combined substantially in the manner and proportions hereinafter stated: soft water, four quarts; common rosin-soap, two and one-half pounds; lamp-black, one-fourth pound; plumbago, eight pounds; indigo, one-half ounce; oil of sassafras, one ounce.

In combining the ingredients the soap is first boiled in the water to dissolve it. The lamp-black, plumbago, and indigo are then added and thoroughly mixed. The mixture is then allowed to cool for a few minutes and the oil of sassafras added. The soap and lamp-black are for the purpose of giving body to the mixture. The plumbago imparts a brilliant iron color or metallic luster, and the indigo gives the desired bluish cast. The oil of sassafras is merely added to impart a pleasant odor, and any other similar oil may be employed for this purpose.

The mixture is preferably applied by means of a woolen or flannel rag, or a brush or dauber may be used. The stove is then rubbed with a dry flannel rag to bring out the polish.

This composition affords a lasting polish, is free from dust accompanying its use, and is not destroyed by a high heat. It also is not liable to flake off.

What I claim is—

1. The stove-polish composed of water, rosin-soap, lamp-black, plumbago, and indigo, combined substantially in the manner and proportions specified.

2. The stove-polish composed of water, rosin-soap, lamp-black, plumbago, and indigo, and a flavoring oil, all combined substantially in the manner and proportions specified.

In testimony whereof I affix my signature in presence of two witnesses.

EMIEL STAHL.

Witnesses:
RICHARD W. ISBELL,
LOUIS C. MATTOX.